Patented May 3, 1938

2,116,482

UNITED STATES PATENT OFFICE 2,116,482

METHOD OF PRODUCING FERMENTING AGENT

Charles von Friedrich, Valdese, N. C., assignor, by mesne assignments, to John P. Rostan, Valdese, N. C.

No Drawing. Application April 8, 1936, Serial No. 73,303

8 Claims. (Cl. 195—66)

This invention relates to a method of removing invertase and zymase enzymes and their co-enzymes from yeast cells, molds and other invertase and zymase bearing substances by breaking the cell membranes and subjecting the cells to a relatively low pressure to remove the invertase and zymase enzymes and their co-enzymes from the cells whereby the solution obtained is far more active in producing fermentation than a like amount of yeast.

This application is a continuation in part of my co-pending application, Serial Number 61,757, filed January 31, 1936.

It is an object of this invention to provide a method wherein yeast cells, molds and other invertase and zymase bearing substances may be broken and then the membranes thereof remaining and the unremoved enzymes in the broken cells together with any unbroken cells are removed from the liquid containing the enzymes which liquid may be placed in containers for future use if desired. The remaining liquid may be subjected to a catalyst before being placed in the containers to thereby increase the activity of the enzymes when later used.

It is another object of this invention to provide a method of rendering the enzymes of yeast cells which are capable of producing alcoholic fermentation more active and also reducing said enzymes to a form where they will keep for long periods of time at normal temperature without employing any chemical preservative until placed in contact with substances capable of being fermented.

It is a further object of this invention to provide an agent capable of producing alcoholic fermentation at much lower cost than has heretofore been obtainable and in which the elapsed time of fermentation is greatly reduced which comprises rupturing yeast cells and other invertase and zymase bearing cells by suitable mechanical means such as by subjecting the cells to abrasive and impacting apparatus, freezing and rapid thawing, forcing the cells through an orifice smaller than the cells, passing the cells through a colloid mill, and in fact through any mechanism or process to rupture the membranes of the cells. Also the cells may be opened chemically and then subjected to mechanical means to remove therefrom the invertase and zymase enzymes but leaving in the cells other undesirable intra-cellular enzymes such as endotryptase and the like. The enzymes of invertase and zymase can then be filtered from the ruptured membranes and any unruptured cells. Then if desired, the enzymes of invertase and zymase can be subjected to a suitable catalyzing operation. Then the catalyzed enzymes can be concentrated, if desired, by any suitable means such as by osmosis, by removing a portion or all of the solvent therefrom, by precipitation by use of organic or inorganic compounds, or by coagulation, such as by passing a high tension electric current therethrough to bring the enzymes to a highly concentrated form. Whether catalyzed or both catalyzed and concentrated, the enzymes can be placed in sealed containers to remove the enzymes from exposure to fermentable matter, and can be used at later periods without the necessity of keeping the same in a refrigerated compartment.

It is still another object of the invention to provide a method whereby invertase and zymase bearing cells can be subjected to an operation to break the membranes of the cells and remove the invertase and zymase enzymes therefrom but leaving within the ruptured cells the intra-cellular enzymes which are destructive to the enzymes invertase and zymase so that the invertase and zymase content of the cells are rendered much more available in fermentation processes than when enclosed within cells.

It is still a further object of the invention to provide a method whereby fermentation producing substances can be removed from sources carrying the same and leaving in said sources the undesirable substances which are deleterious to the substances removed. For example, some substances have only zymase enzymes therein and no invertase enzymes, such as pomegranate seed, and I desire it to be understood that my process and method covers the removal of substances capable of producing alcoholic fermentation whether these substances be singular or plural and at the same time leaving in the materials the substances which are deleterious to the fermentation producing substances.

Briefly, the process may be summarized as follows:

(1) The substance is placed in an abrading mill with sand and glass or other abrasive therein and subjected to the abrading operation to open the yeast cells, molds, and other invertase and zymase bearing substances and at the same time exerting sufficient pressure on the cells to remove from the cells the invertase and zymase enzymes, but which pressure is not sufficient to remove the enzymes which are harmful to the invertase and zymase enzymes, among which classification is endotryptase.

(2) After the operation of opening the yeast cells, molds and other invertase and zymase bearing substances has been performed, a suitable diluent such as a 10% glycerine is added thereto.

(3) The substance with the diluent is then pressed through a canvas bag by a weak hand press exerting a pressure of about 100 pounds per square inch to remove the coarser abrasive therefrom.

(4) The solution bearing the enzymes invertase and zymase is then passed through a suitable filter to remove the finer abrasives, the broken membranes and whole cells therefrom.

(5) The strength of the solution is then standardized by a suitable method such as by determining the amount of gas generated by a given weight of the solution and a like amount of weight in yeast in a given time, and after the ratio is compared the solution is diluted with water or other inert diluents. For example, a 10% glycerine solution may be used to lower it to the desired strength.

(6) If desired, the standardized solution can be made more active as compared with yeast by a catalyzing operation such as by the addition of an insoluble phosphate such as calcium phosphate.

(7) If the solution is to be concentrated, this operation is carried out prior to the standardization operation, and comprises passing high tension electric current therethrough to coagulate the solution.

(8) If the concentration operation is carried out, then the solution may be mixed with inert material to weaken the same.

(9) The product is now ready for use. If desired, the concentration operation may be dispensed with and the solution may be used after standardization.

(10) If desired, the above-named steps can be dispensed with and the substance can be passed or forced through an orifice which is smaller than the size of the yeast cells, molds and other invertase and zymase bearing substances, and the substance can then be used directly by placing the same in the matter to be fermented, or it can be used to a greater advantage by a standardization process before use.

(11) After the substance has been passed through said orifice, a diluent and carrier can be added thereto to make a solution, then the solution can be passed through a filter, then standardized as to strength, or if desired to concentrate the same, the standardization process can be omitted, and the solution can be subjected to the concentration process described above under paragraph (7).

(12) Then inert matter can be added to the same after concentration, as set forth in paragraph (8).

For a long period of time the world accepted fermentation as a direct activity of yeast cells themselves. By some research work conducted by Buchner and Pasteur it was found that fermentation is not carried on by living cells directly, but by a secretion that cells produce.

Many types of yeast were described by Pasteur, but each one of them gave essentially the same products of fermentation. It can be said that fermentation is a production of three new compounds derived from breaking down a sugar. These compounds are carbon dioxide, alcohol and water.

When sugar is introduced into a product capable of being fermented to produce ethyl alcohol and carbon dioxide, the sugar can be of either a bi-hexose or a single-hexose. The first class of sugars can be generalized in the heading of disaccharides, while the latter class are known as the hexoses. In case the disaccharide is used it is necessary for it to be broken up into hexoses before a fermentation can result. The most generally used disaccharide is sucrose which is found in both cane and beets.

This breaking down of sugars from disaccharides to hexoses is known as inversion, and can be represented by the following equation:

$$C_{12}H_{22}O_{11} \text{ plus } H_2O \text{ equals } C_{12}H_{24}O_{12} \rightarrow 2C_6H_{12}O_6$$

The active principle was found to persist even though the living cells were completely destroyed. This destruction could be accomplished by heating the cells to a killing point which made the cells incapable of further growing but which did not destroy the ability of their carrying on fermentation.

It is necessary to study the nature of the surviving material in yeasts cells, which is capable of carrying on alcoholic fermentation. It has been found that this property is due to two enzymes which have been named invertase and zymase. We can define an enzyme as the part of the living cell that carries on the activity of the cell from a chemical standpoint. My new method of fermentation deals with a way to liberate the enzymes invertase and zymase contained within the cells and to leave attached to the cells the intracellular enzymes which are detrimental to the activity of the invertase and zymase enzymes and to render the invertase and zymase contents of the cells much more active than they would ordinarily be. In other words, I am liberating and making available the invertase and zymase enzymes direct, and not waiting for nature to perform the freeing.

Of the two invertase and zymase enzymes, invertase should be first discussed. This enzyme is the factor which changes the disaccharides into the hexoses which are capable themselves of being broken down into the resultant products of alcoholic fermentation. After the sugars have become reduced to hexoses it is then possible for the zymase to carry on directly its activity which is the completion of alcoholic fermentation.

Several types of mills can be used for carrying on the work that I wish to accomplish. A full description of one of these will be given and modification of this can be readily seen by one familiar with mills. One suitable type of mill may be described as follows:

A stone crock is fitted with a tight lid. Into the crock may be introduced a quantity of ordinary yeast; this can be either of the compressed variety or else the yeast taken from the solution from which it has been grown and the natural moisture retained therein. With this yeast is mixed abrasives and then by prolonged grinding the abrasives penetrate and puncture the yeast cells. As an example, sand and glass can be used. About one-half as much abrasive as yeast has been found preferable. To all of this is added some pieces of case hardened steel shafting about five inches long and an inch in diameter. The pieces of shafting are case-hardened so as to render the same incapable of liberating any deleterious amount of iron and therefore they cannot liberate iron in a quantity sufficient to have any detrimental effect on the enzymes invertase and zymase which are released from the yeast cells. The number and size of such pieces of shafting will vary considerably according to the capacity and speed of the mill, but for a mill holding ten gallons and revolving at the rate of about forty R. P. M., about thirty pieces of shafting of the sizes mentioned has been found suitable. After the crock has been loaded it is placed in a device capable of revolving it along its longitudinal axis at the rate desired. It is necessary during the revolution of the mill to cool the outside surface of the crock so that the yeast cells will not become warm and have a tendency to grow or sporulate. It is best to maintain a temperature of about 34° F. within the crock. This will prevent the yeast from becoming active and growing buds, which would reduce its enzymic activity. The temperature can be maintained by allowing the crock to revolve in a pan of ice and water or else a jacket can be made around the crock and mechanical refrigeration applied.

The abrading operation must be effected along certain lines or the results will not be desirable. Heretofore, Buchner and others have extracted yeast juice but the solution was not as effective as a like amount of yeast. A great quantity of yeast juice was obtained by Buchner from a given amount of yeast but its effectiveness was not so pronounced. The reason for the lack of practicability of the solution obtained by Buchner and others heretofore was due largely to two steps in the processes employed. Buchner and other investigators used sand and kieselguhr, which was not treated to remove the iron therefrom, which is known to always be present in such materials, to a greater or less extent. Iron is destructive to invertase and zymase enzymes. Secondly, he and other investigators used pressures many fold in excess of what I use, which not only forced the invertase and zymase enzymes from the cells, but also forced from the cells other substances such as endotryptase which in association with invertase and zymase enzymes served to destroy the invertase and zymase enzymes and thus what the iron failed to do the endotryptase and other harmful enzymes completed the destruction of the invertase and zymase enzymes and that is why no one heretofore has produced self preserving and commercially practical invertase and zymase enzyme disassociated from the harmful contents of the cells.

I avoid the causes of failures experienced by others heretofore by performing the opening and pressing process on the cells by the mechanism previously outlined or by any other suitable means in such a manner as to puncture the cells and exerting just enough pressure thereon to force the invertase and zymase enzymes and their co-enzymes from the cells but not enough pressure to force the other contents of the cells therefrom which are harmful to invertase and zymase enzymes, such as endotryptase and the like. This plan of limiting the pressure applied to the mass of yeast cells is also followed in pressing from the mass the diluent carrying the invertase and zymase enzymes through the filter cloth. The slight pressure by a hand press which is applied to the filter cloth only forces the invertase and zymase and their co-enzymes through the punctured cells and also only forces the invertase and zymase enzymes freed by the abrading operation through the cloth, leaving the undesirable enzymes in the cells.

In order to obtain enzymes of highest activity it is essential that the abrasives used be iron free or as near iron free as is possible. However, if erodable iron has been accidentally introduced into the mass it can be removed by making the solution slightly alkaline with either a hydroxide or a carbonate. It is well to free the sand from iron before introducing it into the mill by digesting the sand with warm hydrochloric acid and then washing with pure water until all traces of acid have been removed. After this has been done the sand can be ignited to expel organic matter that may be present.

The glass should be of hard and flinty variety such as broken bottles or plate glass or any type of iron free flinty glass. Before placing the glass into the mill it is advisable to wash it in warm water to get rid of any foreign matter that may adhere thereto.

Instead of the sand and glass abrasives mentioned hereabove, other abrasives can be substituted with varying degrees of success, for example, emery, carborundum, calcite, granite, etc.

During grinding at occasional intervals if desired samples of the mass may be removed and subjected to microscopic examination to determine the percentage of cells that have been opened. When approximately 90% of the cells have been opened the mill may be stopped and the mass removed from the mill. I have found that when using the above described apparatus that after nine hours of operation 90% of the yeast cells are ruptured or altered. If a greater percentage of rupturing or alteration of the cells is desired, the period of the abrading operation may be prolonged. The pieces of steel shafting are removed and the mixture of ground yeast and abrasives is diluted with a suitable amount of 10% solution of glycerine.

The next step is to separate the enzymes consisting essentially of invertase and zymase and other enzymes which are not deleterious to alcoholic fermentation from the remaining living cells, the harmful enzymes such as endotryptase, and the membranes of the broken cells, also to remove the abrasives. This may be done by any suitable means such as by placing the entire mass in a filter cloth and subjecting the same to a relatively small pressure which will force the invertase and zymase enzymes, their co-enzymes, and other enzymes which are not deleterious to alcoholic fermentation from the mass and through the filter cloth, but which pressure is insufficient to remove from the cells in the mass the other enzymes which are harmful to alcoholic fermentation such as endotryptase. The solution will then contain the enzymes invertase and zymase extracted together with the diluent employed, some living yeast cells, some of the shells of the broken yeast cells, and fine particles of abrasives that have gone through the bag. The remaining mass in the bag is again stirred with an equal volume of a diluent and again pressed through the filter cloth as in the first instance. The two solutions are then combined and are ready for purification.

After the solution has been through the filter cloth it can be purified by means of passing the same through a suitable filter such as a slow sand filter. This filter may be constructed from a conically-shaped receptacle in the bottom of which is placed large pebbles and then filled with layers of sand of different sizes; starting large and gradually getting smaller and smaller as the top of the filtering bed in the receptacle is reached.

The filter is preferably connected to a suction line so that the solution may more easily pass through the filter. The residue remaining in or on the filter consists of dead yeast cells, living yeast cells and particles of abrasives that have escaped through the first filtration. The filtrate consists of the enzymes zymase and invertase and other aids to alcoholic fermentation, mixed with the diluent, together with some coloring matter. The percentage of the glycerine solution may be varied considerably as desired. The glycerine solution may be added before or during the grinding operation if desired, instead of placing it in the mass after grinding.

With this enzymic solution alcoholic fermentation can then be carried on without further processing; however, it is possible to accelerate the fermentation by means of a suitable catalyzer. I have found that an insoluble phosphate is preferable as a catalyzer. I have also found that the finer grain to which the calcium phosphate is reduced, the more active it becomes as a catalytic agent. The most efficient results are obtained by passing calcium phosphate through a colloidal mill so that the calcium phosphate is so finely divided that it will remain partially suspended in this enzymic solution.

Other investigators have found that soluble phosphates act as activators for invertase and zymase enzymes, but I have found that an insoluble phosphate is much more effective.

In order to arrive at the relative strength of this solution as compared with yeast, I take weighed amounts of yeast and of the enzymic solution and mix them separately with the ingredients necessary to make a dough for making bread, said dough in both cases having like amounts of ingredients. These doughs are then placed in flasks which are connected to a graduated glass measuring tube and the amount of gas evolved is measured by the amount of water displaced from the measuring tube. From this it is calculated the relative strength of the enzyme solution as compared to that of yeast, the strength of the yeast being taken as a base unit. The solution is then adjusted by the addition of further amounts of a diluent so that one pound of solution will be equal to sixteen pounds of ordinary yeast, so that one ounce of the solution equals in fermenting activity one pound of yeast; however, any other value can be established for the enzyme solution, or it can be adjusted to be of equal strength to yeast itself.

So far as is known, the enzymes invertase and zymase are found in yeast cells of all varieties. Among the more common varieties may be mentioned, Saccharomyces cerevisiae, Saccharomyces pastorianus, Saccharomyces apiculatus, and Hansenia apiculata. These two enzymes are also found in many of the common molds especially in mucor types. Certain seeds within fruits contain appreciable quantities and the method heretofore described is applicable to seeds. In many instances these enzymes exist singularly and the method of extracting, purification and standardization as outlined, is applicable in each instance.

An example of a substance having only one enzyme present is that of the pomegranate seed. This seed has only zymase enzymes present therein. Therefore, when the process is carried out with substances having only zymase enzymes, a solution can be produced, which when used with an inverted sugar, will cause direct alcoholic fermentation. It is also very desirable in that this solution will not tear down the gluten in flour.

When commercial baker's yeast is used as a standard in fermentation, my theory is that the sugar solution surrounding it is sucked into the cells and then discharged through the membrane of the cells themselves, bringing with it small quantities of the invertase and zymase enzymes present within. No fermentation can begin until these enzymes have escaped from the cells and have become completely separated therefrom. In the case of yeast, only a small percentage of the actual zymase and invertase is ever available for use, and long periods of time must elapse before an appreciable quantity of the enzymes have escaped into the surrounding sugar solution. By the method herein disclosed, about 80% of the total invertase and zymase enzymes are made available for use in alcoholic fermentation. In other words, from one pound of yeast the invertase and zymase enzymes extracted, when activated and used in a fermenting solution, is equivalent to fifty to eighty pounds of ordinary yeast.

A solution of invertase and zymase enzymes prepared in this manner is very stable and it is possible to store such solutions in glass bottles at ordinary room temperatures for a long period of time, due to the fact that the harmful enzymes such as endotryptase are not present therein. This offers considerable advantage over ordinary handling of yeast which must be kept fresh and stored in a cool dry place. The prepared enzyme solution remains inactive up to as high as 137° F. This offers unlimited advantages in transportation to all parts of the country without the necessity of any precautions. Time and money can thus be saved by the elimination of the now necessary expensive delivery systems.

When yeast is used in a fermentation for making bread, a very narrow latitude of temperature is allowed in order to properly grow and produce yeast cells which are necessary to produce a healthy fermentation. With the use of this enzyme solution it is possible to eliminate this narrow latitude of temperature which is so essential for yeast fermentation because the enzyme-solution does not have any living cells to propagate. This would mean that no accurate and elaborate system of temperature control in fermentation rooms is necessary.

It is possible to accidentally introduce foreign bacteria in yeast when ordinary commercial compressed yeast is used in fermentation. With the use of this enzyme solution only a pure and true fermentation can result.

During fermentation with yeast a certain amount of the gluten in flour is attacked and destroyed in order to arrive at mineral constituents within the flour to build up the cell body of the yeast which is partially made up of the mineral matter. With the use of enzyme solution this destruction will not take place as the cell free solution does not have to be built up by mineral matter and for this reason greater yield of finished product will result.

In ordinary yeast fermentation in many cases yeast foods are employed, the purpose of which is to furnish mineral matter directly to the yeast cells for their growth.

By the use of my enzyme solution the fermentation period can be greatly shortened over that of the ordinary yeast fermentation period due to the fact that the enzymes have been introduced directly to the fermenting mass, and it is not necessary to await the escapement of the enzymes from the cells which require a long period of time.

For medicinal purposes this enzyme solution may be substituted for yeast. This solution may be taken in minute quantities to produce the same results as yeast. It is easy to see the great advantage to be had in allowing smaller dosages in more concentrated form than where a large bulk of an unpleasant product must be used.

Where mashes and liquids must be fermented, as in distilleries and breweries the direct introduction of invertase and zymase enzymes offers unlimited opportunities. No attention need be paid to isolate pure cultures of yeast, which must be done at great expense of both time and labor, as the introduction of these enzymes produces a direct alcoholic fermentation which is not altered by the presence of foreign cells. In yeast fermentation of these mashes and liquids, again a narrow latitude of temperatures is necessary, and by the use of enzymes the same advantages which were pointed out in bread making are applicable in the case of mash and liquid fermentation.

When the solution of invertase and zymase enzymes has been so prepared, a great strength, as compared with yeast, is attained. It is possible, however, to still further concentrate this solution by means of passing an electric current having high tension and high amperage through the solution whereby the enzymes are coagulated out of the diluent, and by further filtering through a filter cell, the enzymes can be retained on the cell and as such are completely removed. These concentrated enzymes can be used in very small quantities to produce alcoholic fermentation. However, due to their tremendous activity it is better to remix these concentrated enzymes with some inert material such as flour or salt. They can also be mixed with water or with any substances which are not of a fermentable nature. This can then be introduced into the mass to be fermented, in accurately weighed and controllable amounts.

Yeast cells vary between 4 and 8 microns in size. There are many mills on the market that can be adjusted to grind, crush, flatten or rupture particles much smaller in size than yeast cells. Some types of these mills rely upon forcing the substances through minute orifices. The size of the orifices can be adjusted to as close as 1 micron. It is therefore, only necessary to force the yeast cells through the orifices to complete the opening of the yeast cells. In so doing the enzymes present therein become available to a greater extent than they were originally in yeast. This material can be used advantageously in any mass that is to be fermented, and can be introduced directly without further treatment. However, the invertase and zymase enzymes can be separated from the ruptured or altered yeast cells and purified and concentrated by essentially the same methods that have been previously outlined.

The same principle can be applied for extracting zymase and invertase from other concurrent sources as has been outlined with yeast.

When a colloid mill is used for rupturing the cells, this colloid mill, of course would be of a suitable non-iron transmitting material so that it would not impart to the cells and the substances derived therefrom sufficient iron to be detrimental to the activity of the substances removed from the cells. This colloidal mill can be set with an opening of the proper size through which the cells are forced so that the membrane of the cells would be ruptured and probably in some cases practically removed from the contents of the cells, but the opening in the mill would be of such size as to cause sufficient pressure to be exerted on the cells and or their contents to cause a separation of the substances capable of producing alcoholic fermentation from the other substances in the cells which are deleterious or harmful to the alcoholic fermentation producing substances.

With this method of extraction no abrasives need be used because the breaking or altering of the cells is mechanically accomplished by directly forcing them through the small space. Therefore, there will be no particles of abrasives in the resultant material. This material can then be directly introduced into a mass to be fermented without any further treatment or purification. The activity of the yeast will be greatly increased due to partial freeing of the invertase and zymase enzymes contained therein. This offers a method of increasing the activity of commercial yeast applicable to all industries using yeast in fermentation.

The rupturing or altering of the cells may also be accomplished by forcing them with or without a liquid through tightly constructed rollers or series of rollers, which are spaced closer to each other than the size of the cells being crushed. The rollers used in rupturing or altering of these cells could be made of agate or some other non-eroding material. After a microscopic examination to determine the number of cells thus altered, and the optimum maximum has been reached the rolling is stopped, and then the solution or mass obtained is ready for direct use in fermentation or else can then be filtered, purified and concentrated as explained previously.

Again it is possible to extract the enzymes zymase and invertase separately or combined as was previously outlined. From the method lastly described, other ways of extracting these enzymes suggest themselves, and the method of extracting includes all means mechanical or otherwise capable of rupturing, crushing, flattening, puncturing or exploding cells which contain within themselves the enzymes invertase and zymase. Regardless of the source, these two enzymes, zymase and invertase carry on alcoholic fermentation in the same manner as when extracted from the yeast cells themselves.

Throughout the specification where I have referred to "cells", I wish it to be understood that this term includes not only yeast cells proper but also all substances having therein zymase and invertase, either in combination or alone.

In the specification there has been set forth a preferred embodiment of the invention, and although specific terms are employed, they are used in a generic and descriptive sense only, and not for purposes of limitation, the scope of the invention being set forth in the appended claims.

I claim:

1. That method of treating zymase enzyme bearing cells under conditions incapable of transmitting iron in sufficient quantities to have any detrimental effect on the zymase enzymes, to extract the zymase enzymes therefrom and to leave in the cells substantially all of the endotryptase, which is harmful to the zymase enzymes, which comprises rupturing and pressing the cells with sufficient pressure to remove the zymase enzymes from the cells but said pressure being insufficient to remove the endotryptase, and filtering the enzymes invertase and zymase from the mass under a pressure which is sufficient to remove the enzymes invertase and zymase, but insufficient to remove the endotryptase.

2. That method of extracting from yeast cells enzymes invertase and zymase and leaving in the cells substantially all of the endotryptase, which is harmful to the activity and preservation of the enzymes invertase and zymase when associated therewith outside the cells, which comprises mechanically processing the yeast cells to rupture the same and exerting sufficient pressure to remove therefrom the enzymes invertase and zymase, but which pressure is insufficient to remove from the cells enough of the enzyme endotryptase, to affect the enzymes invertase and zymase, maintaining said mass substantially free from soluble iron during said processing, then adding a diluent and carrier to the mass, then filtering the diluent and carrier with the enzymes invertase and zymase from the mass by a low pressure filter which will not remove the endotryptase, then activating the enzymes invertase and zymase with calcium phosphate.

3. That method of preparing from yeast cells a stable fermenting agent which will remain stable over long periods of time without being kept in a refrigerated atmosphere and consisting essentially of the enzymes invertase and zymase, which comprises subjecting the yeast cells to a combined abrading and pressure operation to rupture the same and limiting the pressure to a point below that which will force the harmful enzyme endotryptase from the cells, then subjecting the ruptured mass of cells to a filtering operation under a pressure which is less than one hundred pounds per square inch to remove from the yeast cells the enzymes invertase and zymase but which pressure is not sufficient to remove from the yeast cells the enzyme endotryptase, which is harmful to the enzymes invertase and zymase.

4. That method of preparing from yeast cells a stable fermenting solution which will remain stable over long periods of time without being kept in a refrigerated atmosphere and consisting essentially of the enzymes invertase and zymase, which comprises subjecting the yeast cells to a combined abrading and pressure operation incapable of transmitting a deleterious amount of iron, to rupture the yeast cells and limiting the pressure to a point below that which will force the harmful enzyme endotryptase from the cells then subjecting the ruptured mass of yeast cells to a filtering operation under a pressure which is less than one hundred pounds per square inch to remove from the yeast cells the enzymes invertase and zymase but which pressure is not sufficient to remove from the yeast cells the enzyme endotryptase which is harmful to the enzymes invertase and zymase.

5. That method of preparing from yeast cells a stable fermenting solution which will retain its fermentative activity over long periods of time at ordinary room temperatures and consisting essentially of the enzymes invertase and zymase, which comprises subjecting a mass of yeast cells to a combined abrading and pressure operation to rupture the same and limiting the pressure to a point below that which will force the harmful enzyme endotryptase from the yeast cells maintaining the yeast cells substantially free from iron during said combined abrading and pressure operation, then subjecting the ruptured mass of yeast cells to a filtering operation under a pressure which is less than one hundred pounds per square inch to remove from the yeast cells the enzymes invertase and zymase but which pressure is not sufficient to remove from the yeast cells the enzyme endotryptase which is harmful to the enzymes invertase and zymase.

6. That method of preparing a fermenting agent from a mass of yeast cells which will retain its fermentative activity over long periods of time at ordinary room temperatures and which agent consists essentially of the enzymes invertase and zymase, which comprises subjecting the yeast cells to a combined abrading and pressure operation, to rupture the yeast cells, but at the same time limiting the pressure so as not to remove from the cells the enzyme which is harmful to the enzymes invertase and zymase, maintaining the mass of yeast cells substantially free from iron during said abrading and pressure operation, then filtering the enzymes invertase and zymase from the mass of yeast cells by means of a filter press exerting a pressure which is not great enough to extract from the yeast cells the enzyme endotryptase, which is harmful to the enzymes invertase and zymase.

7. That method of preparing a stable fermenting solution from a mass of yeast cells which will retain its fermentative activity over long periods of time at ordinary room temperatures, and consisting essentially of the enzymes invertase and zymase, which comprises mechanically processing the mass of yeast cells under relatively low pressure to rupture the yeast cells, but not removing therefrom the enzyme endotryptase, which is harmful to the enzymes invertase and zymase, maintaining said mass of yeast cells substantially free from iron while mechanically processing the same, then subjecting the yeast cells to a filtering operation under a pressure which will remove from the yeast cells the enzymes invertase and zymase, and will leave in the mass of yeast cells the said harmful enzyme endotryptase.

8. That process of preparing a stable solution from yeast cells consisting essentially of the enzymes invertase and zymase, and capable of producing alcoholic fermentation and which will retain its fermentative activity over long periods of time when stored at room temperature, which comprises subjecting the yeast cells to a combined abrading and pressure operation to rupture the cells but limiting the pressure to a point below that which will remove the harmful enzyme endotryptase, then subjecting the ruptured yeast cells to a filtering operation while being subjected to a pressure sufficient to remove the enzymes invertase and zymase and which will not remove the harmful enzyme endotryptase, and then activating the removed enzymes invertase and zymase with calcium phosphate.

CHARLES von FRIEDRICH.